COMBINED HOUSING AND TAPE RETAINING MEANS FOR TAPE HOLDING REELS

Filed March 16, 1955

INVENTOR
THOMAS S. KULKA
BY Ulmon S. Nelson
ATTORNEY

INVENTOR
THOMAS S. KULKA

BY Almon S. Nelson.
ATTORNEY

Jan. 6, 1959
T. S. KULKA
2,867,318
COMBINED HOUSING AND TAPE RETAINING MEANS
FOR TAPE HOLDING REELS
Filed March 16, 1955
5 Sheets-Sheet 3

INVENTOR
THOMAS L. KULKA

BY [signature]
ATTORNEY

INVENTOR
THOMAS S. KULKA
BY
Almon S. Nelson
ATTORNEY

INVENTOR
THOMAS S. KULKA

BY Edmon S. Nelson
ATTORNEY

United States Patent Office 2,867,318

Patented Jan. 6, 1959

2,867,318

COMBINED HOUSING AND TAPE RETAINING MEANS FOR TAPE HOLDING REELS

Thomas S. Kulka, Cleveland, Ohio

Application March 16, 1955, Serial No. 494,771

1 Claim. (Cl. 206—59)

This invention relates to the utilization and storage of tapes commonly employed in the magnetic recording of sound or for film used in motion pictures, and more particularly to devices for housing or partially housing the reels upon which such tape is commonly wound and for simultaneously preventing unwinding of the tape from such reels.

The use of tape coated with a magnetic substance for recording sound has increased to a remarkable extent over the past few years and, in order to prevent damage to the tape which is commonly stored on reels, it is imperative that some means be provided to house or partially house such reels and, at the same time, prevent inadvertent unwinding of the tape therefrom. This means should be relatively inexpensive and should be capable of application to the reel with a minimum of effort and, at the same time, provide an effective means for holding the tape against unwinding and without damage to such tape or the reel upon which the same is wound. It is further desirable that means be provided for housing or partially housing the reel in order to protect the same and prevent an undesirable accumulation of dust or other foreign substance thereon and, obviously, such housing means should occupy a minimum of space.

Heretofore, it has been common practice to prevent the unwinding of tape from a reel by merely placing an elastic band or the like about such tape on the reel and storing the reel, either in individual boxes or containers, or storing a plurality of reels in a single container. It has also been proposed to utilize various types of clips or spring means which attach to the reel and in various ways engage the tape thereon to prevent inadvertent unwinding. Unfortunately the use of many of these prior art devices for preventing inadvertent unwinding of the tape requires a considerable degree of manual dexterity in order to hold the reel, prevent the tape from unwinding and apply the device to the reel in such a manner as to properly engage the tape, and at the same time, prevent damage thereto by scratching or other damage caused by too great a pressure on the tape. Furthermore, many of these prior art devices were completely useless for preventing the unwinding of tape from a reel when such tape only partially filled the reel, leaving a relatively wide space between the outer circumference of the tape and the outer circumference of the flanges of the reel. Furthermore, few, if any, of these prior art devices provided any means for simultaneously housing or protecting the reels of tape and it was therefore necessary to apply the clip or other securing means to the reel and thereafter insert the reel in whatever container was provided therefor. It appears obvious that a combined housing and tape retaining means in which it is only necessary to insert the reel in the housing and, at the same time, engage the tape retaining means with the tape on such reel would be highly desirable and represent a very material step forward in the art.

It is accordingly an object of this invention to provide a combined housing and tape retaining means for tape holding reels which may be economically manufactured from readily available materials and in which the reel may be inserted therein in proper position for preventing unwinding of the tape by a simple manual operation.

A further object of the invention is the provision of a combined housing and tape retaining means for tape holding reels in which the housing may be constructed from cardboard or other suitable materials and which may provide a complete or partial housing for the reel and in which the tape retaining means combined therewith may consist of an elastic band of rubber or other suitable material, positioned in a container in such a manner as to automatically engage the tape on the reel when the reel is inserted therein.

A still further object of the invention is the provision of a combined housing and tape retaining means for tape holding reels in which the tape retaining means may be conveniently renewed in the event of breakage or damage thereto.

Another object of the invention is the provision of a combined housing and tape retaining means for tape holding reels in which the tape retaining means is fully operative to prevent inadvertent unwinding of the tape regardless of the length of such tape present on the reel.

Another object of the invention is the provision of a combined housing and tape retaining means for tape holding reels in which an individual box having a hinged cover is provided and in which it is only necessary to insert the reel therein in order to completely house the same and prevent inadvertent unwinding of the tape thereon.

A still further object of the invention is the provision of a combined housing and tape retaining means for tape holding reels in which the housing may take the form of a box open at the top and provided with a hinged cover or may take the form of a sleeve which may be inserted in a slidable cover, or may be merely in the shape of a frame provided with the tape retaining means and in which a suitable cover is provided to completely enclose the same after insertion of the reel.

Another object of the invention is the provision of a combined housing and tape retaining means for tape holding reels in which the tape retaining means operates to retain the reel in the housing and, at the same time, prevent inadvertent unwinding of the tape thereon.

A further object of the invention is the provision of a combined housing and tape retaining means for tape holding reels in which a single tape retaining means in the form of an endless elastic band may be utilized to simultaneously engage two reels of tape to retain the same in the housing and, at the same time, prevent inadvertent unwinding of the tape thereon.

A still further object of the invention is the provision of a combined housing and tape retaining means for tape holding reels in which the tape retaining means may take the form of an elastic band provided with a non-elastic insert for engaging the tape on the reel.

Another object of the invention is the provision of a combined housing and tape retaining means for tape holding reels in which the tape retaining means may take the form of a non-elastic band provided with a tension spring connecting the ends thereof, in order to permit a resilient engagement with the tape on the reel to hold the same in the container or housing and, at the same time prevent inadvertent unwinding of the tape thereon.

A further object of the invention is the provision of a combined housing and tape retaining means for tape holding reels in which metallic springs of various shapes and sizes may be provided in the housing to engage the tape on the reel and prevent unwinding thereof, while at the same time, retaining the reel in the housing.

A still further object of the invention is the provision of a partial housing and tape retaining means for tape holding reels in which the housing may take the form of an arcuate or semi-circular member engaging the flanges of the reel and provided with an elastic member for engaging the tape on such reel to hold the housing member thereon and, at the same time, prevent inadvertent unwinding of the tape.

A still further object of the invention is the provision of a tape retaining means utilizing an elastic band for engagement with the tape on a reel and in which such elastic band is held in place by a strip extending across the reel and having means receivable in the spindle receiving aperture of the reel to prevent inadvertent displacement of the tape engaging band.

A still further object of the invention is the provision of an album type housing for a reel of tape and provided with means for retaining the reel in such housing and, at the same time, preventing inadvertent unwinding of the tape thereon.

Another object of the invention is the provision of a reel holding and tape retaining means in which the reel is mounted and retained on a base and in which means engage the tape on such reel to prevent unwinding thereof, the last named means being formed in such a manner as to prevent entry of the same between the tape and a flange of the reel.

A still further object of the invention is the provision of a combined housing and tape retaining means for tape holding reels in the form of a chest for receiving a plurality of reels and in which the top wall of the chest may, if desired, be inclined for convenience, and in which the reels of tape are held or received in individual compartments and the tape thereon engaged by an elastic means to prevent inadvertent unwinding therefrom, this means also serving to retain the reel in position in the chest.

Further objects and advantages of the invention will be apparent from the following description taken in conjunction with the accompanying drawings wherein.

Figures 32, 33, 34:
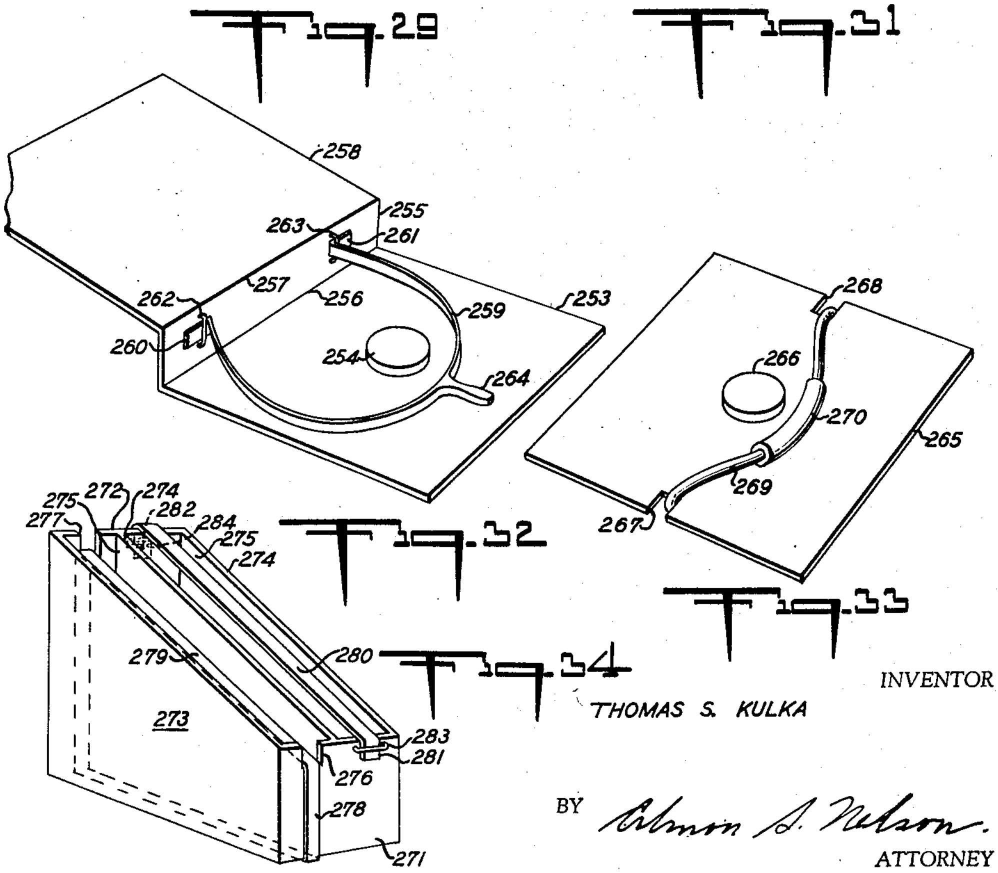
Fig. 32 is a view in perspective, showing an album type housing and tape retaining means for tape receiving reels in which a stud is provided for engaging the spindle receiving aperture in the reel and in which an elastic tape engaging means is provided for retaining the reel in the album and for preventing inadvertent unwinding of the tape thereon.

Fig. 33 is a view in perspective showing a reel supporting and tape holding means comprising a base together with means for engaging the tape on the reel to retain the same on the base and prevent inadvertent unwinding of such tape, there again being provided means for preventing entry of the tape holding means between the tape and a flange of the reel; and Fig. 34 is a fragmentary view in perspective, showing a reel receiving chest and two types of tape retaining means for retaining the reels in the chest and also for preventing inadvertent unwinding of the tape thereon.

Figure 1:
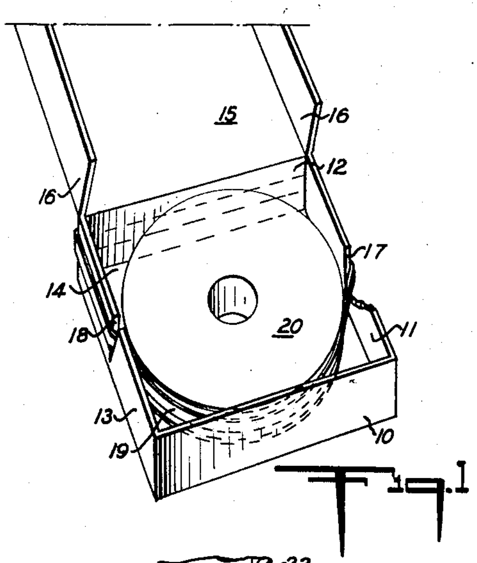
Fig. 1 is a view in perspective, showing a combined housing and tape retaining means constructed in accordance with this invention and in which the housing comprises a box having an open top and with a hinged cover for closing the same, the tape retaining means comprising an endless elastic band, a reel being shown within the box.

With continued reference to the drawing there is shown, in Fig. 1, one form of a combined housing and tape retaining means constructed in accordance with this invention and which may well comprise side walls 10, 11, 12 and 13, and a bottom wall 14 providing a box open at the top. A cover 15 may be hingedly secured to the side wall 12, and such cover 15 may be provided with depending flanges 16 which serve to surround a portion of the side walls 10, 11 and 13 when the cover 15 is in closed position. Provided in side wall 11 is a slit 17 disposed substantially midway of the length thereof and extending vertically, slightly more than one-half the total height of the side wall 11. Also provided in the side wall 13 is a slit 18 similar in location and dimensions to the slit 17 in side wall 11.

Tape retaining means in the form of an endless elastic band 19 is disposed in the slits 17 and 18, as clearly shown in Fig. 1, and such band extends across the box and along the side walls 11 and 13 and around the side wall 12. Of course, if desired, the elastic band 19 may be secured together at its ends by any suitable means rather than utilizing an endless band. Such band 19 may be formed of rubber or any other suitable elastic material.

Figure 2:
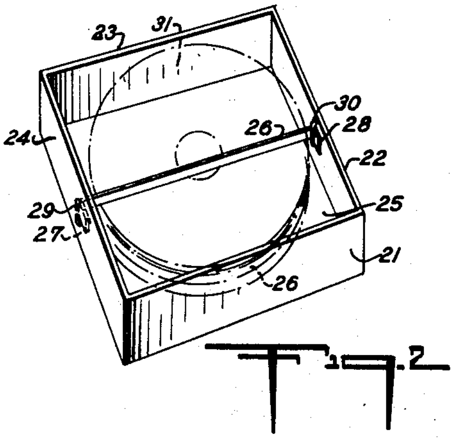
Fig. 2 is a perspective view similar to Fig. 1, and showing a different form of tape retaining means.
Figure 3:
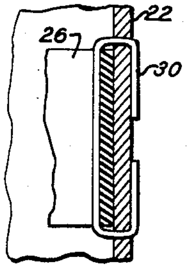
Fig. 3 is a fragmentary sectional view showing one manner of securing the tape retaining means to the walls of the box.

With the box empty the band 19 extends thereacross between the slits 17 and 18, as shown in Fig. 2 with a short band 26, but when it is desired to position a reel of tape in such box, the reel 20, as shown in Fig. 1, is positioned therein with the portion of the band 19 within the box engaged between the flanges of the reel and in engagement with the tape thereon and, of course, the band 19 may engage between the reel flanges adjacent the wall 10 or may be engaged between the reel flanges adjacent the wall 12. In either event, the band 19 will resiliently engage the tape and prevent unwinding thereof and, at the same time, since the same is positioned between the flanges of the reel will prevent inadvertent displacement of the reel from the box. Due to the elasticity of the band 19 the reel will be urged against the wall opposite that from the side of the reel engaged by the band and will, of course, securely hold the same in place. As will be seen, the reel 20 may be conveniently inserted in the box with the band 19 properly engaging the tape merely by sliding the reel in at an inclined position until such time as the reel is in proper location to move downwardly into the box. Thereafter the cover 15 may be closed thereby completely housing and protecting the reel of tape and, of course, the tape will be prevented from inadvertently unwinding by the above described engagement of the elastic band 19.

Since the above described form of the invention may be every economically manufactured by conventional methods of box making and, of course, the box may be manufactured of cardboard, plastic or any other suitable material and, further, since the tape retaining means merely comprises a conventional elastic band and the same may be assembled with the box by merely inserting the same in the slits 17 and 18, the cost of such combined housing and tape retaining means may be maintained at an absolute minimum and will not materially add to the cost of the tape and reel which may be supplied together with the box or housing and tape retaining means. Furthermore, the housing and tape retaining means will have a relatively long life, since the only part likely to deteriorate is the elastic band which may, of course, be conveniently replaced at any time with a conventional elastic band available at any stationary supply house or the like.

A slightly modified form of housing and tape retaining means is shown in Fig. 2 and this form of the invention may well comprise side walls 21, 22, 23 and 24 together with a bottom wall 25 thereby providing a box open at the top similar to the box described above in connection with Fig. 1. In this form of the invention, however, there are no slits provided in the side walls, but the tape engaging and retaining means 26 takes the form of an elastic band having its ends 27 and 28 secured to opposite side walls 22 and 24 substantially midway of the length thereof by means of staples 29 and 30 or by and other suitable means. A reel of tape 31 is inserted in the box in the same manner as the reel 20, described above in connection with Fig. 1, and the elastic band 26 operates in exactly the same manner to retain the reel therein and prevent inadvertent unwinding of tape thereon. The elastic band 26 may, of course, be renewed if necessary, by merely removing the staples 29 and 30 and stapling a new elastic band in place.

Figure 4:
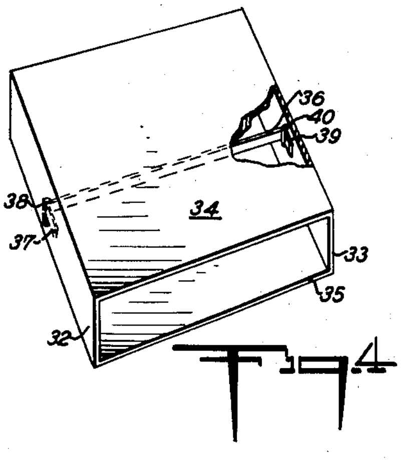
Fig. 4 is a view in perspective, showing another form of housing providing a sleeve open at both ends and with the tape retaining means secured to opposite side walls.

In Fig. 4, there is shown another modified form of housing of the sleeve type which may well comprise side walls 32 and 33, a top wall 34, and a bottom wall 35, thereby providing a box open at opposite ends and, obviously, a reel of tape may be inserted from either end of such box. The tape retaining means utilized in this form of the invention comprises an elastic band 36 extending across the interior of the box substantially midway of the length thereof and the end 37 of the band 36 may be secured to the side wall 32 by a staple 38 or other suitable means and, likewise, the end 39 of the band 36 may be secured to the side wall 33 by a similar staple or other suitable means 40. Of course, in utilizing this form of the invention, it is understood that, after insertion of the reel of tape within the box, a suitable cover, such as an open-ended box, will be applied thereto to close the end of the box and retain the reel therein with the elastic band 36 engaging the tape to prevent inadvertent unwinding thereof.

Figure 5:
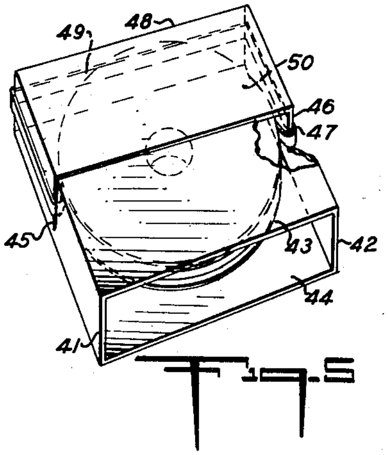
Fig. 5 is a view in perspective, showing a housing of the sleeve type as shown in Fig. 4, but in which the tape retaining means comprises an elastic band extending across the housing inwardly thereof and also across one open end.

In Fig. 5 there is shown a sleeve type box similar to that described above in connection with Fig. 4, and in which there is provided side walls 41 and 42, a top wall 43 and a bottom wall 44 thereby again providing a box open at opposite ends. In this form of the invention, the side wall 41 is provided with a slit 45 substantially midway of the length thereof and opposite such slit there is provided another slit 46 in the side wall 42. An elastic band 47 extends through the slits 45 and 46 and across the interior of the box and the band 47 also extends along the side walls 41 and 42 and across the open end 48 of the box, as shown in dotted lines at 49. In this form of the invention, the reel of tape 50 would be inserted into the box from the end opposite to end 48 between the top wall 43 and the bottom wall 44, and such reel would engage the portion of the band within the box to move the same toward the opposite end 48 of such box and thereafter the same side of the tape on the reel would lie adjacent to but spaced from the portion of the band 49 extending across the end of the box 48. Of course, the band 47 has portion 49 thereof disposed between the flanges of the reel and engages the tape thereon and, in this form of the invention, retains the reel within the box and, at the same time, prevents inadvertent unwinding of the tape therefrom.

Figure 6:
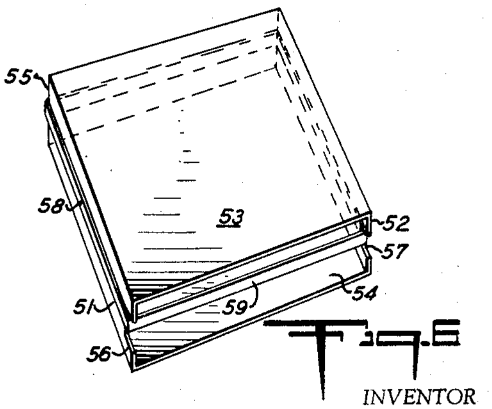
Fig. 6 is a view in perspective, showing a housing open at one end and in which the tape retaining means extends entirely around such housing and across the open end.

In Fig. 6, there is shown a housing and tape retaining means consisting of box having side walls 51 and 52, a top wall 53, a bottom wall 54 and an end wall 55 thereby providing a box open at one end. The side wall 51 is provided with a notch 56 at the open end of the box and, likewise, the side wall 52 is provided with a notch 57 at the open end of the box. An endless elastic band 58 extends entirely around the side walls 51 and 52 and the end wall 55 of the box, and a portion 59 of the band 58 extends through the notches 56 and 57 and across the open end of the box. Inserting a reel of tape in the housing of this form of the invention, such reel is inserted with the tape contacting the portion of the band 59 at the open end of the box and between the top wall 53 and the bottom wall 54 and entirely into the box until such time as the portion of the band 59, engaged with the tape on the reel to prevent the same from unwinding, approaches the end 55 to securely hold the reel within the box. If desired, a cover may be provided to be applied over the box from the open end thereof.

Figure 7:
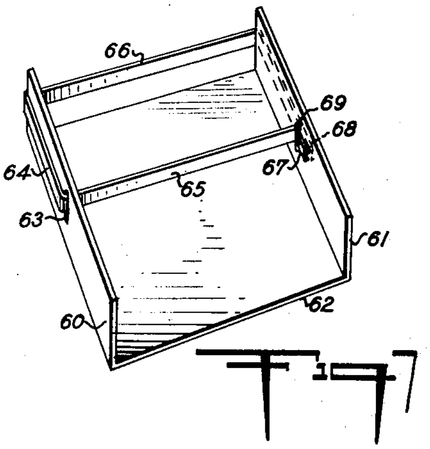
Fig. 7 is a view in perspective, in which the housing comprises only side walls and a bottom wall and in which the tape retaining means extends between the two side walls and across one open end.
Figure 8:
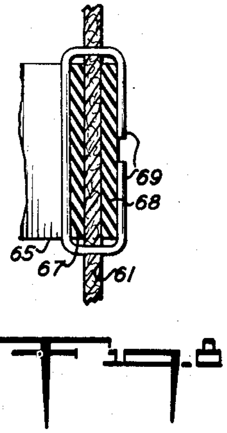
Fig. 8 is a fragmentary view in section showing one means for securing the ends of the tape retaining means utilized in the form of the invention shown in Fig. 7.

A still further modified form of the invention is shown in Fig. 7, and this may well comprise side walls 60 and 61 and a bottom wall 62 thereby providing a box open at the ends and the top. The side wall 60 is provided with a slit 63 substantially midway of the length thereof and an elastic band 64 may extend through the slit 63 to provide a portion 65 extending across the box inwardly thereof and the band 64, as clearly shown in Fig. 7, extends along the side wall 60 and is provided with a portion 66 extending across one open end of the box, thereafter extending along the side wall 61 to a point substantially opposite the end 67 of the portion 65 of the band 64. The end 68 of the band 64 and the end 67 thereof may be conveniently secured to the side wall 61 by means of a staple 69 or other suitable fastening means extending therethrough, and engaging both ends of the band 64. This method of securing the ends of the band is clearly shown in Fig. 8.

In utilizing this form of the invention, the reel of tape would be positioned between the portions 65 and 66 of the band 64 and the entire assembly would be enclosed by a suitable cover. Of course, the engagement of the portions 65 and 66 of the band 64 between the flanges of the reel and in contact with the tape thereon would retain the reel within the box and, at the same time, prevent inadvertent unwinding of the tape.

Figure 9:
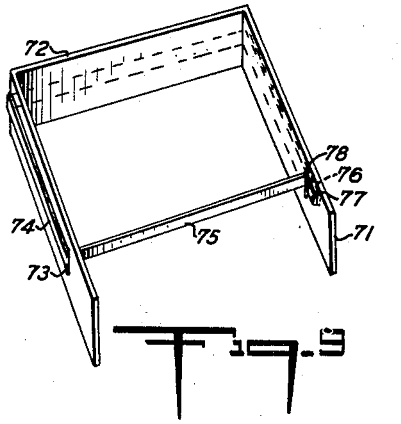
Fig. 9 is a view in perspective, showing a still further form of housing provided with side walls and a single end wall and in which the tape retaining means extends between the side walls and around the end wall.

In Fig. 9 there is shown a box comprising sidewalls 70 and 71 and an end wall 72 which result in a box open at the top and bottom and at one end. A slit 73 is provided in the side wall 70 and an elastic band 74 extends through the slit 73 to provide a portion 75 disposed within the box and extending thereacross, the band 74 also extending around the end wall 72 and along the side wall 71 to provide an end 76 disposed on the outside of side wall 71 substantially opposite the end 77 of the portion 75 of the band 74. Ends 76 and 77 of the band 74 may be conveniently secured to the side wall 71 by a staple or other suitable means 78 extending through the side wall 71 and engaging both of the ends 76 and 77. In this form of the invention, the reel of tape is disposed between the portion 75 of the band 74 and the end wall 72, and due to the resiliency of such band, the reel is securely held in place and the tape thereon prevented from unwinding. Once again it is assumed that the box of this form of the invention will be enclosed in a suitable cover to fully protect the reel of tape contained therein.

Figure 10:
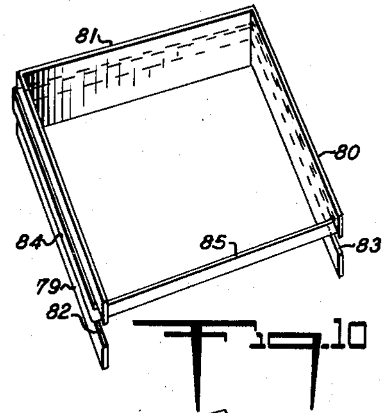
Fig. 10 is a perspective view showing a housing similar to that shown in Fig. 9, and in which the tape retaining means extends across the ends of the side walls and also entirely around the remainder of the housing.

The structure shown in Fig. 10 is somewhat similar to that described above in connection with Fig. 9, and may comprise side walls 79 and 80 together with an end wall 81 thereby providing a box open at the top and bottom and at one end. Side wall 79 is provided with a notch 82 at the free end thereof and side wall 80 is provided with a similar notch 83 at the free end thereof. An endless elastic band 84 extends entirely around the side walls 79 and 80 as well as the end wall 81 and through the notches 82 and 83 to provide a portion 85 extending across the open end of the box. The reel of tape is positioned in the box with one side thereof in engagement with the end wall 81 and with the portion 85 of the band 84 disposed between the flanges at the opposite side of the reel and engaging the tape thereon. This engagement of the portion 85 of the band 84 serves to retain the reel within the box and, at the same time, prevent unwinding of the tape thereon. If desired, a suitable cover may enclose the entire box and protect the reel and tape therein.

Figure 11:
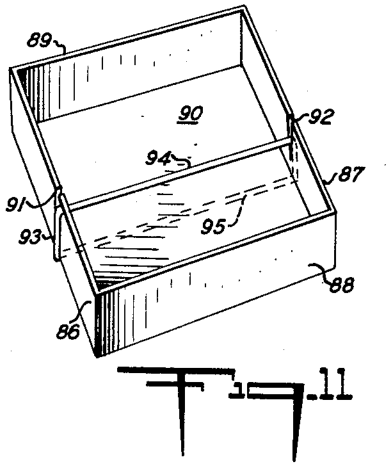
Fig. 11 is a view in perspective, showing a housing consisting of a box open at the top and in which the tape retaining means extends through slits in the side walls of the box and around the bottom of such box.

The modified form of the invention shown in Fig. 11 is somewhat similar to that described above in connection with Fig. 1, in that there is provided a box having side walls 86 and 87 and walls 88 and 89 and a bottom wall 90 providing a box open at the top. A slit 91 is provided in the side wall 86 substantially midway of the length thereof and a similar slit 92 is provided in the side wall 87 opposite the slit 91. An endless elastic band 93 is disposed in the slit 91 and 92 with a portion 94 thereof extending across the box and with the remainder of the band 93 extending around the bottom of the box, as shown in dotted lines at 95 in Fig. 11. The box of this form of the invention may be provided with a hinged top, as described above in connection with Fig. 1, or a separate top may be utilized, if desired, to properly enclose the same. A reel of tape is inserted in the box in the same way as the form of the invention shown in Fig. 1, in that the portion 94 of the band 93 within the box engages the tape between the flanges of the reel and securely holds the reel in the box and, at the same time, prevents inadvertent unwinding of the tape. Obviously, the band 93 may be conveniently replaced by simply removing the same and inserting a new band in the slit 91 and 92 and applying the same around the box, as shown.

Figure 12:
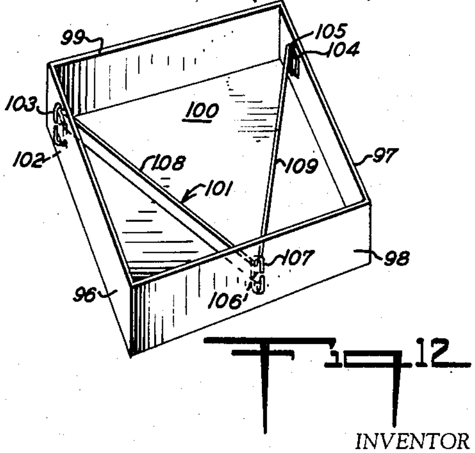
Fig. 12 is a view in perspective, showing another form of housing and tape retaining means in which the housing is a box open at the top and in which the tape retaining means comprises an elastic band secured to the side walls and one end wall of the box to provide a V-shaped tape engaging band.

The housing and tape retaining means shown in Fig. 12 comprises side walls 96 and 97, and walls 98 and 99, and a bottom wall 100, providing a box open at the top and an elastic band 101 is disposed in the box with one end 102 thereof secured to the side wall 96 by suitable means, such as a staple 103, and it is to be noted that the end 102 of the band 101 is located adjacent the end wall 99. Similarly the end 104 of the band 101 is secured to the side wall 97 by suitable means, such as a staple 105, and once again the end 104 is located substantially opposite the end 102 and adjacent the end wall 99. The mid-point 106 of the band 101 is secured to the end wall 98 by suitable means, such as a staple 107, and this staple is located substantially midway of the length of the end wall 98 to provide an elastic band of substantially V shape having legs 108 and 109 extending at an angle to the side walls 96 and 97 of the box. In use, a reel of tape is disposed in the box with the legs 108 and 109 of the band 101 engaging the tape between the flanges of the reel and on opposite sides thereof to urge the reel into contact with the end wall 99 of the box and thereby retain the reel in place and prevent inadvertent unwinding of the tape.

Figure 13:
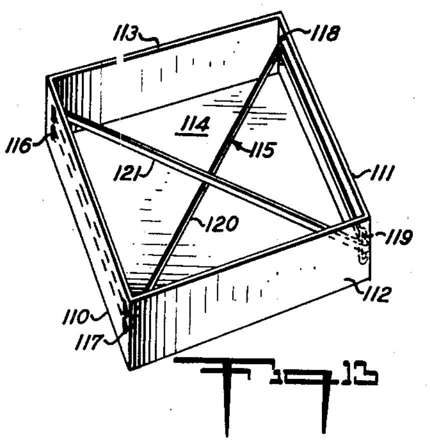
Fig. 13 is a view in perspective, showing a box for receiving two reels of tape and in which the tape retaining means comprises an endless elastic band twisted to form an X, with one portion of the band crossing the other band at a different elevation, the lower band serving to engage one reel of tape and the upper band serving to engage a second reel of tape.

The form of the invention shown in Fig. 13 provides a housing and a tape retaining means for two reels of tape and comprises side walls 110 and 111, end walls 112 and 113 and a bottom wall 114 providing a box open at the top. An endless elastic band 115 is twisted to form a cross, with portions of the band secured by staples or other suitable fastening means 116 and 117 at spaced points to the side wall 110 and with the opposite end of the band 115 secured by staples or other suitable fastening means 118 and 119 at spaced points to the side wall 111, thereby providing a lower band 120 extending between diagonally opposite corners and an upper band 121 extending between the other diagonally opposite corners. In utilizing this form of the invention, a reel of tape is first inserted in the box in engagement with the lower portion of the band 120 and moved into position with the sides of the reel urged against the end wall 112 and the side wall 111, or, if desired, of course, the reel could be disposed on the other side of the lower band 120. After installation of the lower reel, the second reel may be inserted in the box with the same engaging the upper band 121 on either side thereof and, obviously, both reels of tape will be retained in the box and the tape wound thereon prevented from unwinding by engagement of the band portions 120 and 121 therewith.

Figure 14:
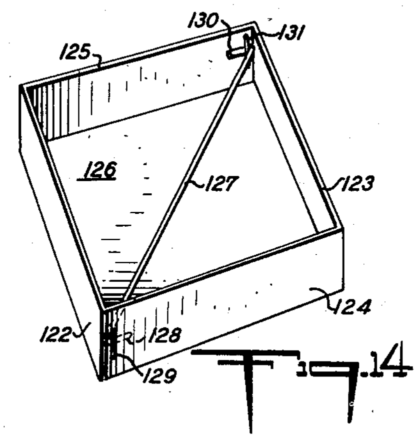
Fig. 14 is a view similar to Fig. 13, but showing a tape retaining means in the form of a band extending between diagonally opposite corners of the box and intended to engage a single reel of tape.

Fig. 14 shows a box comprising side walls 122 and 123, end walls 124 and 125 and a bottom wall 126 providing a box open at the top. Disposed within the box and extending substantially between diagonally opposite corners is an elastic band 127, and one end 128 of the band may be conveniently secured to the end wall 124 by a staple or other suitable fastening means 129 at a location adjacent that corner of the box. The opposite end 130 of the band 127 may be secured to the end wall 125 adjacent the opposite corner of the box by a staple or other suitable fastening means 131. The reel of tape may be disposed in the box on either side of the diagonally disposed band 127, and such band will, of course, be disposed between the flanges of the reel in engagement with the tape thereon to retain the reel in the box and prevent unwinding of the tape.

Figure 15:
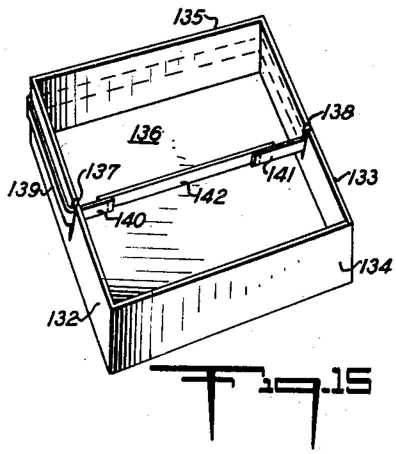
Fig. 15 is a view of a similar type of housing, but in which the tape retaining means comprises an elastic band provided with a non-elastic insert for engaging the tape on the reel to be retained therein.

Fig. 15 shows an arrangement similar to Fig. 1 in which the box comprises side walls 132 and 133, end walls 134 and 135 and a bottom wall 136 providing a box open at the top. Side wall 132 is provided with a slit 137 substantially midway of the length thereof and side wall 133 is provided with a slit 138 substantially midway of the length thereof and opposite the slit 137. An elastic band 139 extends around the end wall 135 and portions of the side walls 132 and 133 with the ends 140 and 141 of the band 139 extending through the slits 137 and 138 respectively. Connecting the ends 140 and 141 of the band 139 is a strip 142 of non-elastic material, such as a suitable plastic or the like, and this strip 142 is maintained in a tensioned condition by the elastic band 139. The reel of tape is disposed in the box in this form of the invention in the same manner as described above, in connection with Fig. 1, and the main difference is that the tape is engaged by the non-elastic strip 142 and the reel held in place, due to the elasticity of the band 139 and the tape prevented from unwinding by engagement therewith of the strip 142.

Figure 16:
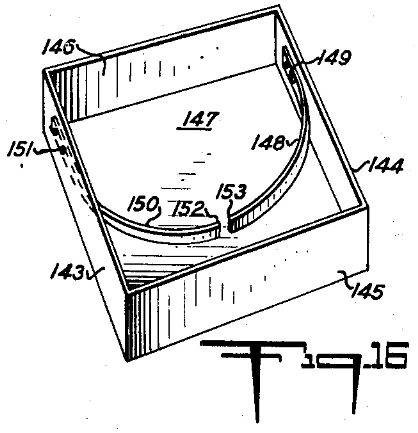
Fig. 16 is a view in perspective, showing an open top box and in which such box is provided with two oppositely disposed curved springs for engaging the tape on a reel to retain the same in the box and prevent inadvertent unwinding thereof.

A somewhat different form of the invention is shown in Fig. 16 wherein the box comprises side walls 143 and 144, end walls 145 and 146 and a bottom wall 147 providing a box open at the top. Disposed within the box and providing reel holding and tape retaining means is a spring member 148 which is secured by rivets or other suitable fastening means 149 to the side wall 144 adjacent the end wall 146 and, as shown in Fig. 16, the spring strip or member 148 is curved and extends inwardly of the box toward the end wall 145. A similar spring strip 150 is secured to the opposite side wall 143 by rivets or other suitable fastening means 151 and the strip 150 is curved and extends inwardly of the box toward the side wall 145 with the end 152 thereof terminating a short distance from the end 153 of the spring strip 148. In this form of the invention, the reel of tape is placed in the box over the end wall 146 and with the ends 152 and 153 of the spring strips 150 and 148, respectively, disposed between the flanges of the reel and in engagement with the tape thereon, and it will be noted that the spring strips tend to urge the reel into with the end wall 146 thereby retaining the same in the box and preventing unwinding of the tape thereon.

A similar box comprising side walls 154 and 155, end walls 156 and 157 and a bottom wall 158 is shown in Fig. 14 and provides a box open at the top. Disposed within the box is a tape retaining means comprising a curved spring strip 159 secured at one end by rivets or other suitable means 160 to the side wall 155 adjacent the end wall 157. As will be seen from an inspection of Fig. 17, the curved strip 159 extends inwardly of the box and free end 161 thereof is disposed adjacent the side wall 154 but spaced therefrom in order to allow movement of the free end 161 upon insertion of a reel of tape into the box with the spring strip 159 disposed between the flanges of the reel and in engagement with the tape thereon. Obviously, such engagement retains a reel in the box and prevents inadvertent unwinding of the tape thereon.

Figure 18:
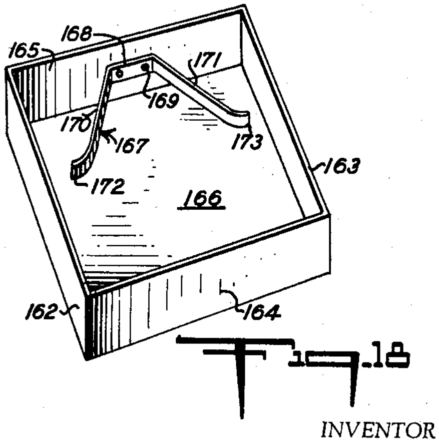
Fig. 18 is a view in perspective, showing an open top box in which a single spring having diverging arms is secured to one end wall of the box, such diverging arms serving to engage the tape on a reel placed therein.

A further modified form of housing utilizing a spring tape retaining means is shown in Fig. 18 and may well comprise a box consisting of side walls 162 and 163, end walls 164 and 165 and a bottom wall 166 providing a box open at the top. The spring tape retaining means of this form of the invention may be provided by a generally U-shaped metallic spring member 167 in which the apex 168 thereof is secured by rivets or other suitable fastening means 169 to the end wall 165 substantially midway of the length thereof. The spring member 167 may be metallic, as stated above, or may, of course, be formed of a suitable plastic or other material and includes diverging arms 170 and 171 extending inwardly of the box and terminating in curved ends 172 and 173 respectively. A reel of tape may be disposed in a box of this form of the invention with the ends 172 and 173 of the arms 170 and 171 disposed between flanges of the reel and with these curved ends engaging the tape on such reel. The outward curvature of the ends presents a smooth surface for engagement with the tape thereby preventing damage thereto and, of course, as the arms 170 and 171 are spread apart by insertion of the reel, the tension will tend to urge such reel against the end wall 164 thereby retaining the reel in the box and preventing unwinding of the tape thereon.

Figure 19:
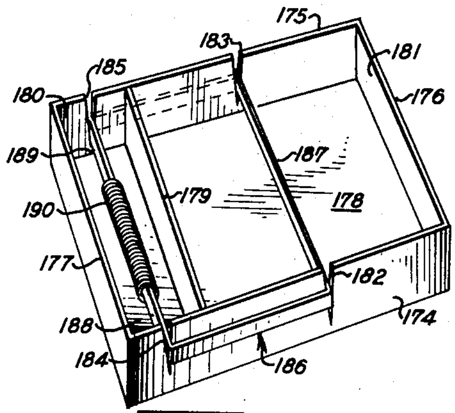
Fig. 19 is a view in perspective, showing an open top box having a partition therein providing two compartments and in which the reel of tape is disposed in one compartment and in which a tension spring is provided in the second compartment connecting the ends of a non-elastic band which, in turn, engages the tape on the reel disposed in the first compartment.

A somewhat more complex form of the invention is shown in Fig. 19 and may well comprise side walls 174 and 175, end walls 176 and 177, and a bottom wall 178, providing a box open at the top. A partition 179 connects the side walls 174 and 175 a relatively short distance from the end wall 177 to provide a relatively narrow compartment 180 between the end wall 177 and 179 and a relatively wide compartment 181 between the partition 179 and the end wall 176. Substantially midway between the end wall 176 and partition 179 there are provided slits 182 and 183 in side walls 174 and 175 respectively and substantially midway between the partition 179 and end wall 177 there are provided slits 184 and 185 in the side walls 174 and 175 respectively.

A non-elastic band 186 is disposed in the slits 182 and 183 providing a portion 187 extending across the compartment 181 and the band 186 extends along the side walls 174 and 175 with the ends thereof projecting through the slits 184 and 185 into the narrow compartment 180. The ends 188 and 189 of the non-elastic band 186 are connected by a tension spring 190 disposed in the narrow compartment 180 and this spring 190 serves to hold the band 186 and the portion 187 thereof within the compartment 181 under tension. The non-elastic band 186 may be of flexible metal, plastic or any other suitable material. In this form of the invention, the reel of tape is placed in the relatively wide compartment 181 at either side of the portion 187 of the band 186 and is held therein in the same manner as described above in connection with the form of the invention shown in Fig. 1. The portion 187 of the tape 186, of course, is disposed between the flanges of the reel and engages the tape thereon to prevent inadvertent unwinding.

Figure 20:
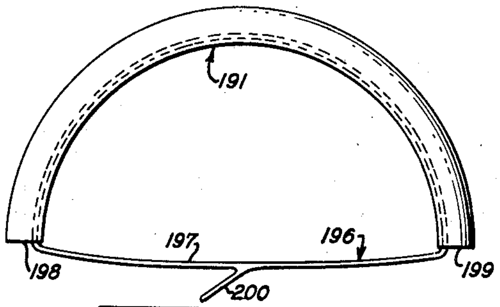
Fig. 20 is a top plan view of a partial housing and tape retaining means in which the housing comprises a semi-circular member for embracing a portion of the reel and in which the tape retaining means comprises an endless elastic band received around the semi-circular member and intended to engage the tape on the reel to retain the same in place.
Figure 21:
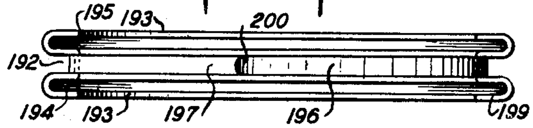
Fig. 21 is a side elevational view of the form of the invention shown in Fig. 20.

A partial reel housing and tape retaining means is shown in Figs. 20 and 21 and may well comprise a semi-circular reel embracing member 191, which may be formed of plastic, metal or any other suitable material and which is of channel cross section, as clearly shown in Fig. 21, there being an outwardly opening, semi-circular channel 192 of a size to be received between the flanges of a reel of tape and, on each edge of the semi-circular reel engaging member, there are provided inwardly extending rims 193 which in turn provide semi-circular reel flange receiving grooves 194 and 195 respectively. An endless elastic band 196 is received in the channel 192 and a portion 197 thereof extends between the ends 198 and 199 of the reel embracing member 191. A finger engaging tab 200 may be formed integral with the elastic band 196, or may be attached thereto in any desired manner and provides a convenient means to manipulate the portion 197 of the band 196 extending between the ends 198 and 199 of the reel embracing member 191.

In utilizing this form of the invention, the reel embracing member 191 is applied to the reel with the channel portion 192 disposed between the flanges of the reel and with the edges of such flanges received in the grooves 194 and 195. The tab 200 is then grasped in the fingers of the user and the portion 197 of the elastic band 196 stretched over the reel and disposed between the flanges thereof at the opposite side from the embracing member 191, whereupon the portion 197 of the band 196 will engage the tape on the reel and securely hold the reel in engagement with the reel embracing member 191 and, of course, at the same time, prevent unwinding of the tape on such reel. While this form of the invention also provides protection for a portion of the reel and tape, obviously, the same is extremely economical to manufacture and may be entirely suitable for applications where the reel of tape is to be stored in a chest or other suitable enclosed locations.

Figure 22:
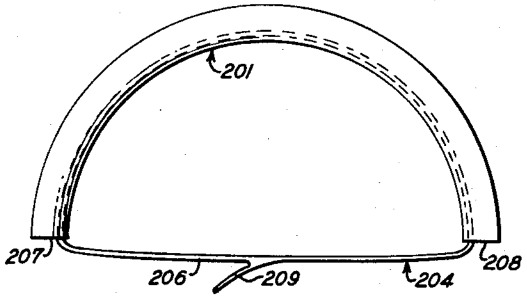
Fig. 22 is a view similar to Fig. 20, but showing a partial housing intended to engage only one flange of the reel.
Figure 23:
Fig. 23 is a side elevational view of the form of the invention shown in Fig. 22.

A reel embracing member intended to engage only a single flange of the reel is shown in Figs. 22 and 23, and this form of the invention is somewhat similar to that described above, and shown in Figs. 20 and 21. The reel embracing member 201 is semi-circular in shape and of S cross section, as clearly shown in Fig. 23, and provides inwardly and outwardly opennig laterally spaced semi-circular grooves 202 and 203 respectively. The reel embracing member 201 may be formed of plastic, metal or any other suitable material and the inwardly opening semi-circular groove 202 is adapted to receive the edge of one flange of the reel. Disposed in the outwardly opening, semi-circular groove 203 is an endless elastic band 204 provided with a portion 206 extending between the ends 207 and 208 of the reel embracing member 201. A finger engaging tab 209 may be formed integral with the portion 206 of the elastic band 204, or may be secured thereto and formed as a separate member in any desired manner. In operation, the reel embracing member 201 is disposed over the edge of one flange of the reel with such edge received in the inwardly opening, semi-circular groove 202 and the tab 209 is grasped in the fingers of the user and the portion 206 of the elastic band 204 stretched over the reel and placed between the flanges of such reel, at the opposite side thereof from the member 201 with the portion 206 of the band 204 in engagement with the tape on such reel. The elasticity of the band 204 will securely hold the reel embracing member 201 in place thereon and the portion 206 of the band 204 in engagement with the tape will prevent inadvertent unwinding thereof.

Figure 24:
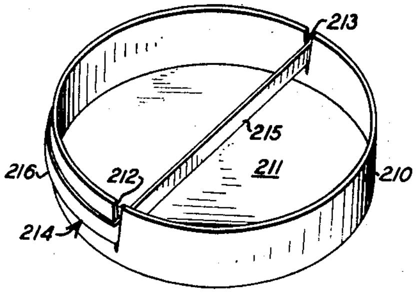
Fig. 24 is a view in perspective, showing a circular housing for receiving a reel of tape and in which the tape retaining means comprises an endless elastic band extending diametrically across the housing and intended to engage the tape on a reel placed therein.

Fig. 24 shows a circular box provided by a circular side wall 210 and a bottom wall 211 and such box is open at the top. The side wall 210 is provided with diametrically opposed slits 212 and 213 and an endless elastic band 214 is disposed in the slits 212 and 213 with a portion 215 thereof extending diametrically across the box and with a portion 216 extending around the circumference of the box. In utilizing this form of the invention, the reel of tape is disposed in the box on either side of the portion 215 of the band 214 and is held therein and the tape prevented from unwinding by engagement of the portion 215 with the tape on such reel. Of course, if desired, a circular cover may be provided for completely enclosing the reel housed in the box.

Figure 27:
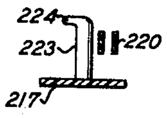
Fig. 27 is a sectional view on the line 27—27 of Fig. 25.
Figures 25, 26:
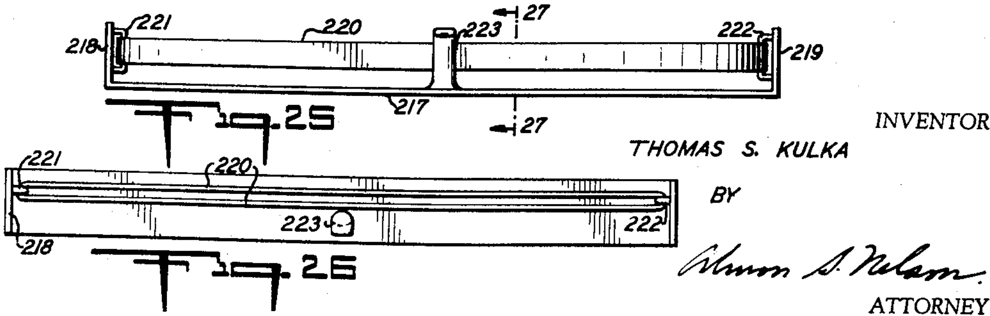
Fig. 25 is a side elevational view of a different form of tape retaining means which is intended to be applied to a reel of tape with a portion engaging the spindle receiving aperture in the reel to prevent inadvertent displacement of the device therefrom.
Fig. 26 is a top plan view of the device shown in Fig. 25.

A tape retaining means only is shown in Figs. 25, 26 and 27 and this may well comprise an elongated, relatively narrow strip 217 of metal, plastic or any other suitable material, and such strip is provided at each end with an upstanding flange 218 and 219. The distance between the flanges 218 and 219 is substantially equal to, or slightly greater than, the diameter of the reel to which the device is to be applied and an elastic band 220 is secured to flanges 218 and 219, by any suitable means such as loops 221 and 222 respectively, or, of course, the band 220 may be secured to the flanges 218 and 219 by staples, adhesive or any other suitable means. Extending upwardly from the strip 217, substantially midway of the length thereof, is a peg 223, and as best shown in Fig. 27, peg 223 is provided at the upper end thereof with an overhanging lip 224, the purpose of which will be presently described. It is also to be noted that the peg 223 is offset laterally from the band 220.

In utilizing this form of the invention, the device is applied to a reel of tape with the band 220 disposed between the flanges of the reel and in engagement with the tape thereon, and the strip 217 is moved toward the center of the reel until such time as the peg 223 may be inserted in the spindle receiving aperture of the reel and the overhanging lip 224 is of such size to pass through this spindle receiving aperture and be disposed on the opposite side of the reel from the strip 217, and such lip 224 will prevent inadvertent displacement of the device from the reel and may retain the same in place thereon until such time as it may be manually removed. While this form of the invention does not operate to provide a housing for the reel, nevertheless, there is provided thereby an extremely simple and economical tape retaining means which will efficiently prevent inadvertent unwinding of the tape from the reel.

Figure 28:
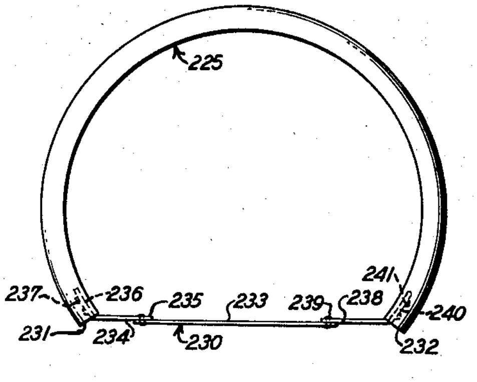
Fig. 28 is a top plan view of an arcuate reel embracing member and in which a tape retaining means extends across the open ends of such member, a portion of such means being elastic and another portion non-elastic.
Figure 29:
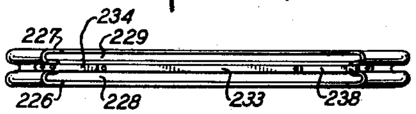
Fig. 29 is a side elevational view of the form of the invention shown in Fig. 28.

In Figs. 28 and 29 there is shown a partial housing comprising a reel embracing member somewhat similar to that shown in Figs. 20 and 21, but in this case, the reel embracing member 225 is arcuate and greater than a semi-circle in circumference, the member 225 being formed of a resilient material, such as plastic, metal or any other desired material and, as shown in Fig. 29, there are inwardly extending rims 226 and 227 on each edge of the member 225, these rims providing inwardly opening, arcuate reel flange receiving grooves 228 and 229 respectively. A band 230 extends between the ends 231 and 232 of the reel embracing member 225 and the band 230 is provided with a central portion 233 of non-elastic material, such as a suitable plastic or the like, and at one end of the portion 233 there is provided an elastic member 234 connected at one end 235 to the non-elastic portion 233 and at the other end 236 by rivets or other suitable fastening means 237 to the end 231 of the reel embracing member 225. At the opposite end of the non-elastic portion 233 there is provided an elastic member 238, one end of which 239 is secured to the adjacent end of the non-elastic portion 233 and the opposite end 240 is secured by rivets 241 or other suitable fastening means to the end 232 of the reel embracing member 225. In utilizing this form of the invention, the reel embracing member 225 is flexed outwardly sufficiently to be received over the flanges of the reel with the edges of such flanges engaging in the arcuate grooves 228 and 229 and with the non-elastic portion 233 of the band 230 engaging the tape on the reel to retain the reel in position in engagement with the member 225 and to prevent unwinding of the tape therefrom.

Figure 30:
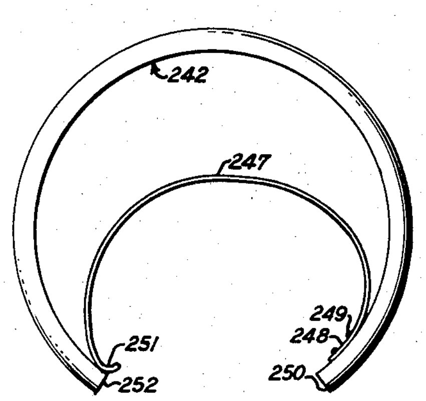
Fig. 30 is a top plan view of a reel engaging member of the type shown in Fig. 28, and in which the tape retaining means comprises a curved spring secured at one end to the reel embracing member and extending inwardly in the plane thereof to engage the tape on a reel embraced by such member.
Figure 31:
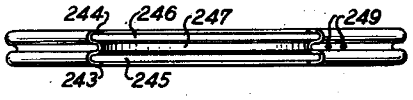
Fig. 31 is a side elevational view of the form of the invention shown in Fig. 30.

A further form of partial housing and tape retaining means is shown in Figs. 30 and 31 and comprises an arcuate tape embracing member 242 having a circumference greater than a semicircle, which member may be formed of metal, plastic or any other suitable resilient material. Each edge of the reel embracing member 242 is provided with an inwardly extending rim 243 and 244 which serve to provide inwardly opening, arcuate reel flange receiving grooves 245 and 246 respectively. A tape engaging and retaining member in the form of a curved spring 247 is disposed within the reel embracing member 242 in the plane thereof and one end 248 of the spring 247 is secured by rivets or other suitable fastening means 249 to the reel embracing member 242 adjacent one end 250 thereof. The opposite free end 251 of the curved spring 247 is disposed within the reel embracing member 242 and adjacent the end 252 thereof and upon placing a reel of tape within the reel embracing member 242, the spring 247 passes between the flanges of the reel and engages the tape thereon to hold the same against unwinding.

An album type housing and tape retaining means is shown in Fig. 32 and may well comprise a back cover 253 of relatively stiff material, substantially rectangular in shape and of a size to accommodate the reel of tape which it is desired to house therein. An upstanding stud 254 is provided on the inner side of the back cover 253 and the stud 254 is adapted to be received in the spindle receiving aperture of the reel. An upstanding flange 255 is provided on one edge 256 of the back cover 253 and hingedly secured to the upper edge 257 of the flange 255 is a front cover 258, also formed of relatively stiff material. An elastic band 259 is secured at its ends 260 and 261 to the flange 255 by suitable fastening means, such as staples or the like 262 and 263. Of course, any other fastening means, such as rivets or an adhesive may be employed to secure the elastic band 259 to the flange 255. As will be noted from an inspection of Fig. 32, the ends 260 and 261 of the elastic band 259 are spaced a substantial distance apart and the band 259 extends outwardly above and along the back cover member 253 to a point somewhat beyond the stud 254. The elastic band 259 may, if desired, be provided with an integral finger engaging tab 264, although such tab may, if desired, be formed separately and attached to the band in any desired manner.

In utilizing this album type housing and tape retaining means, it is only necessary to place a reel of tape on the back cover member 253 with the stud 254 received in the spindle receiving aperture of the reel and thereupon the finger engaging tab 264 may be grasped in the fingers of the user and band 259 stretched and placed between the flanges of the reel and in engagement with the tape thereon to securely hold the reel in place on the stud 254 and also, at the same time, prevent inadvertent unwinding of the tape on such reel. The front cover 258 may then be closed and the reel and tape thereon is housed in an album or book type cover and may be conveniently filed for storage.

A reel supporting and tape holding means is shown in Fig. 33 and, as shown therein, comprises a flat substantially rectangular base 265 which may be formed of cardboard, plywood, plastic or any other suitable material and of a size to support a reel of tape thereon. Substantially centrally of the base 265 there is provided an upstanding stud 266 adapted to engage in the spindle receiving aperture of the tape reel. Notches 267 and 268 are provided in opposite side edges of the base 265 and disposed around such base and extending through the notches 267 and 268 is an endless elastic band 269. Of course, if desired, an endless band need not be used and the same may be secured to the base 265 in any desired manner. The band 269 is provided substantially midway of the length thereof above the base 265, with an enlarged portion 270 which may be in the form of a sleeve received around the band 269, or may be an integral enlargement of the band itself. This enlarged portion 270 is received between the flanges of the reel and serves to engage the tape thereon and, at the same time, prevent entry of the band between the tape and the flange of the reel. In this form of the invention, it is only necessary to place a reel of tape on the base 265 with the stud 266 disposed in the spindle receiving aperture of the reel and upon engagement of the enlarged portion 270 between the flanges of the reel and with the tape thereon, the band 269 will serve to retain the reel in position and prevent unwinding of the tape.

A reel chest and tape retaining means is shown in Fig. 34 and may well comprise a relatively low front wall 271 and a relatively high rear wall 272 connected by trapezoidal shaped end walls 273 and a bottom wall, not shown, which provides a chest having an inclined top. A plurality of partitions 274 extend between the front and rear walls 271 and 272, respectively, to provide a plurality of compartments 275, each adapted to receive a reel of tape.

Two forms of the invention are shown in Fig. 34, and in one form a notch 276 is provided in the front wall 271 in the upper edge thereof and substantially midway of each compartment 275, and a similar notch 277 is provided in the upper edge of the rear wall 272 substantially midway of each compartment 275. An endless elastic band extends around the bottom, front and rear walls of the box and through the notches 276 and 277 and lengthwise of each compartment 275 adjacent the upper end thereof. A reel of tape may be disposed in each compartment by sliding the same between the portion 279 of the band 278 within the compartment and the partition 275 until the same is positioned entirely within the compartment 275, at which time the portion 279 of the band 278 may be positioned between the flanges of the reel and in engagement with the tape thereon, to retain the reel in the compartment and prevent unwinding of the tape on such reel. In this way, a plurality of reels may be housed in a single chest and the tape prevented from unwinding therefrom, such reels being readily available for use at any time.

The other form of the invention shown in Fig. 34 merely involves a change in the method of applying the elastic band, and in this case an elastic band 280 extends lengthwise of each compartment 275 and over the upper edges of the front wall 271 and rear wall 272, the ends 281 and 282 of the elastic band 280 being secured to the front wall and rear wall, respectively, by staples or other suitable fastening means 283 and 284. A reel of tape is disposed in the compartment in this form of the invention in the same manner as above described in connection with the first form of the invention shown in this figure.

It is to be understood that the forms of the invention as shown in Figs. 2, 5, 7, 9, 10, 11, 12, 13, 14, 15, 16, 17, 18, 19, and 24, all of which are what may be termed an insert type, may be received in a box such as that shown in Fig. 6 wherein one end is open and one end is closed.

It is also to be understood that instead of a predetermined length of a flexible band which is stapled to the box an endless flexible band may be employed, and in this case, instead of stapling, slits will be provided such as those shown at 17 and 18 in Fig. 1 and at 45 and 46 in Fig. 5. These modifications could be made with respect to the forms of the invention shown in Figs. 2, 7, 9, 12, 13, and 14.

Figure 17:
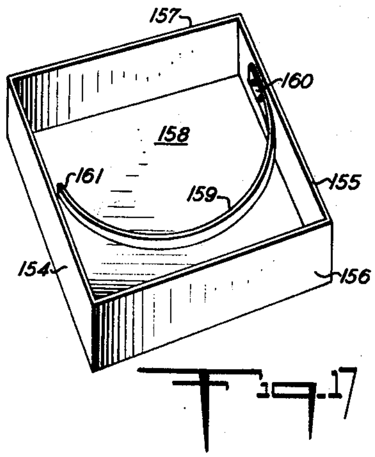
Fig. 17 is a view in perspective, showing an open top box in which a single curved spring is secured to one side wall and serves to engage the tape on a reel placed therein.

If desired, the form of the invention shown in Figs. 16, 17, and 18 can be open-top boxes or open-end boxes, There have been described above many different forms of means for housing a reel of tape and for preventing inadvertent unwinding of the tape thereon, and it will be noted that each form of the invention operates to efficiently perform the desired function and may be provided in accordance with the personal preference of the user. All of the forms of the invention may be economically manufactured and provided at a minimum cost, thereby permitting efficient and safe storage of reels of tape which will securely retain the tape wound thereon. It is also to be noted that all forms of the invention may be applied to or removed from a reel of tape without intricate manual operations and that, consequently, no difficulty should be experienced in utilizing the same.

It will be obvious to those skilled in the art that various changes may be made in the invention without departing from the spirit and scope thereof and therefore the invention is not limited by that which is shown in the drawing and described in the specification, but only as indicated in the appended claim.

What is claimed is:

A combined housing and tape retaining means comprising side walls and a bottom wall providing a generally rectangular box having a greater width than depth, slits in opposite side walls substantially midway of the length and height thereof and an endless elastic band extending through said slits and across said box in a plane substantially parallel to said bottom and substantially midway between said bottom and the tops of said side walls and about the outside of one-half of the box, a flat reel of tape disposed in said box with the portion of said band within said box engaging said tape thereon and retaining said reel in said box and preventing said tape from unwinding from said reel.

References Cited in the file of this patent

UNITED STATES PATENTS

| | | |
|---|---|---|
| 882,557 | Gathright | Mar. 24, 1908 |
| 1,273,377 | Josephson | July 23, 1918 |
| 1,842,034 | Lewis | Jan. 19, 1932 |
| 2,129,198 | Crouch | Sept. 6, 1938 |
| 2,283,709 | Van Ness | May 19, 1942 |
| 2,330,466 | Bergstein | Sept 28, 1943 |
| 2,621,787 | Harris | Dec. 16, 1952 |

FOREIGN PATENTS

| | | |
|---|---|---|
| 411,501 | Germany | Mar. 30, 1925 |
| 475,299 | Great Britain | Nov. 17, 1937 |